Nov. 7, 1972  LARS-OLOV R. OLSON  3,702,167
ATTACHMENT FOR FASTENING A LUGGAGE RACK INTO
THE DRIP MOULDING OF AN AUTOMOBILE
Filed Jan. 18, 1971

INVENTOR.
Lars-Olov Roland Olson
BY
Pierce, Scheffler & Parker
Attorneys

United States Patent Office 3,702,167
Patented Nov. 7, 1972

3,702,167
ATTACHMENT FOR FASTENING A LUGGAGE RACK INTO THE DRIP MOULDING OF AN AUTOMOBILE
Lars-Olov Roland Olson, Trollhattan, Sweden, assignor to Saab-Scania Aktiebolag, Linkoping, Sweden
Filed Jan. 18, 1971, Ser. No. 107,280
Claims priority, application Sweden, Jan. 23, 1970, 842/70
Int. Cl. B60r 9/04
U.S. Cl. 224—42.1 E   3 Claims

ABSTRACT OF THE DISCLOSURE

The present invention relates to an attachment for fastening a luggage rack in the drip moulding of an automobile. The attachment is designed to be easily set on and removed, and the risk of it losing its grip around the drip moulding is lessened. To this end, the attachment has a clamp provided with a locking hook arranged to co-operate with an upright slide in communication with a support. The slide is tightenable in a direction upwards away from the drip moulding in engagement with the locking hook so that the support and the clamp are squeezed firmly like tongs around the drip moulding.

---

The present invention relates to an attachment for fastening a luggage rack in the drip moulding or roof gutter of an automobile whereby a support connected to the luggage rack is arranged to be pulled tight inside the drip moulding and a clamp cooperating with the support is arranged to be simultaneously pulled tight against the underside of the drip moulding.

The aim of the invention is to produce an attachment which is easy to set on and remove and to simultaneously lessen the risk of the attachment losing its grip around the drip moulding.

This objective is achieved by having the attachment primarily characterized in that the clamp is provided with a locking hook arranged to cooperate with an upright slide in communication with the support. The slide is tightenable in a direction upwards away from the drip moulding in engagement with the locking hook so that the support and the clamp are squeezed firmly like tongs around the drip moulding.

Figure 1:
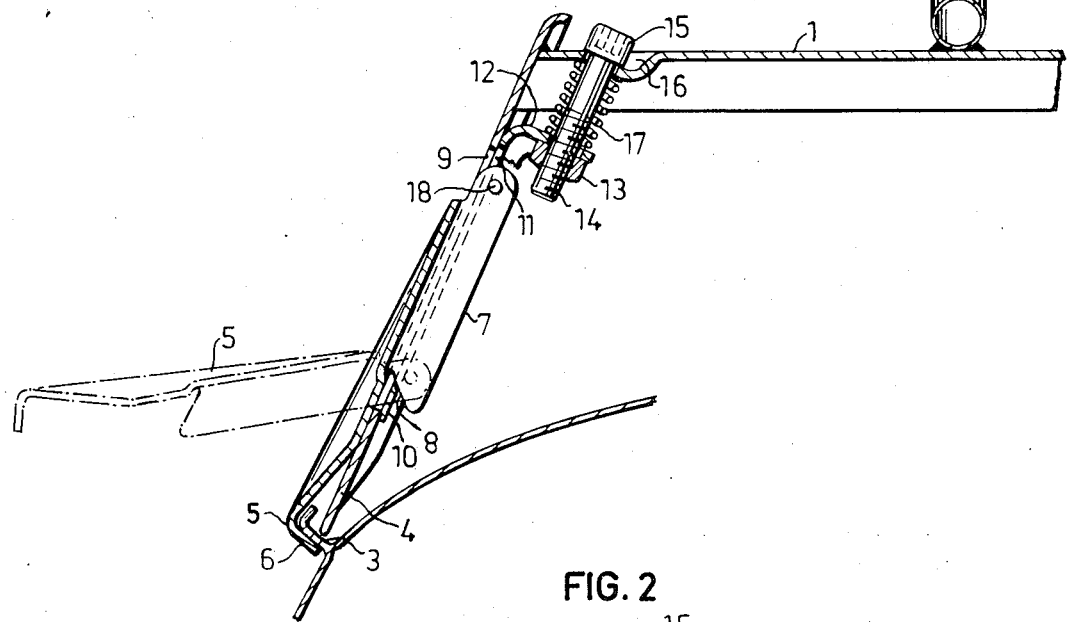
Figure 2:
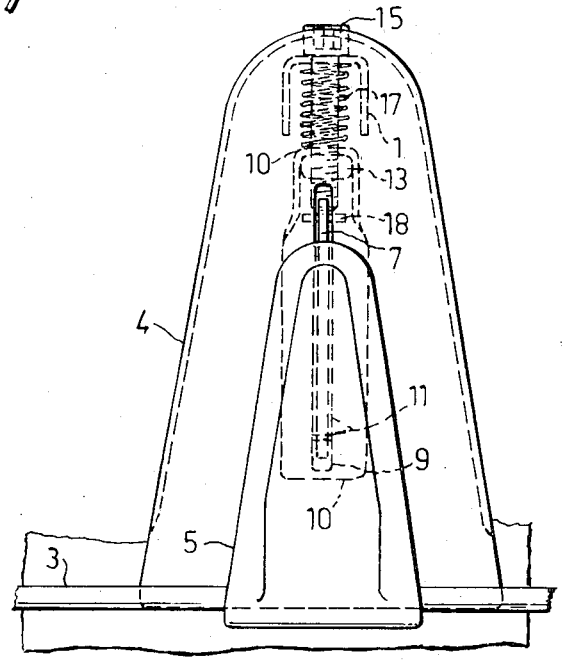

An embodiment of the invention is described below in more detail in conjunction with the accompanying drawing. FIG. 1 shows the attachment partially in section mounted on a car roof from the end of the automobile. FIG. 2 shows the attachment as seen from the side of the car.

The attachment according to the invention is designed to be firmly or loosely connected with one end of beams 1 that extend directly across the roof of a car. The beams could e.g. be used when provided only with holders as a ski rack. The beams could also be united with a receptacle 2 for holding baggage. It is preferable to make the beams 1 extendable so that they can be adapted to cars of different widths. Normally, four attachments are required and these are usually designed to be fixed in the drip moulding 3. The attachment according to the invention is of this type and consists of two main parts: a support 4 designed to lean against the inside of the drip moulding, and a clamp 5 designed to embrace the drip moulding from underneath. Both the support 4 and the clamp 5 have the shape of an essentially isosceles triangle having a rounded off top. The side of the support 4 directly opposite the top is straight and is designed to stand in the drip moulding and can suitably be provided with a recess in the middle in order to stand steadier. The top, rounded off end of the support 4 is connected with one end of a beam 1 by means of a screw or welding. The clamp 5, which is only about ⅔ as high as the support 4, is bent at its lower edge in an essentially right angle so that an edging 6 is obtained whose width is somewhat less than that of the drip moulding externally. In its upper part, the clamp 5 is provided along its vertical centre line with an inturned, welded on edging 7 which constitutes a locking hook and extends out along about one-half the height of the clamp and which in its lower end has an oblique, downwardly chamfered edge 8. In the centre line of the support 4 is a slot 9, whose length is somewhat greater than that of the locking hook 7 and whose width is somewhat greater than the thickness of said locking hook. Thus, the locking hook can be displaced upwardly and outwardly in the slot. Along the inside of the support 4 is a displaceable slide 10 which consists of an essentially rectangular plate with a slit 11 running through its centre. The locking hook 7 can extend through this slit 11. The slide 10 has an inwardly, right angle bent upper part 12 that is provided with a welded on nut 13. A screw 14 is screwed into this nut, extends through a hole in the beam 1 and with its head 15 bears against a stop 16 pressed down in the top side of the beam. Between the beam 1 and the inwardly bent part 12 of the slide, a helical spring 17 is threaded on the shank of the screw. Thus, it is possible by means of the screw 14 to displace the slide upwardly and downwardly along the inside of the support 4. The locking hook 7 is equipped in its upper part with a transverse pin 18 which results in the clamp 5 being held back against the support 4 and makes it possible to swing the clamp away from the support when the luggage rack is to be removed.

When the attachment is to be fixed to the drip moulding, the screw 14 is first screwed out sufficiently far for the locking hook to be freed from the slit 11 in the slide 10 and for the clam 5 to be swung out. The support 4 is placed in the drip moulding 3 and the clamp 5 is swung in towards the support so that the edging 6 of the clamp comes under the drip moulding. The screw 14 is then tightened so that the slide 10 is displaced upwardly and the lower part of the slide slit 11 bears against the chamfered edge 8 of the locking block. With continued tightening of the screw, the clamp 5 is pulled upwards so that a secure grip is obtained around the drip moulding. Because the end edge 8 of the locking hook 7 slants obliquely downwards, the clamp 5 is drawn in under the drip moulding. In this way the clamp will be locked partially downwardly and partially outwardly. If the attachment is to be released, the screw 14 is loosened a few turns so that the slide 10 is downwardly displaced by the spring 17 and the grip around the drip moulding is released. At the same time, the locking hook 7 is exposed so that the clamp 5 can be lowered from the drip moulding as shown in FIG. 1, with broken dotted lines, and the luggage rack can be lifted away from the roof.

The different details in the attachment are preferably made of galvanized sheet iron, but other materials are possible such as aluminium or plastic.

The invention is not restricted to the above description or to the embodiment shown in the drawing. It can be varied in structure and details within the frame of the invention. Therefore, the tightener consisting of a screw 14 and a nut 13 can be replaced by an eccentric arrangement.

What I claim is:
1. An attachment for fastening a roof luggage rack to the roof gutter of an automobile comprising a support member affixed to the luggage rack and extending down- wardly into the roof gutter, a clamp member slidably mounted on the outside of said support member and having an inwardly bent element at the bottom thereof for engaging the underside of the roof gutter, said clamp member having an inwardly extending longitudinal flange element normal to the surface of said clamp member, a movable slide member disposed on the inside of said support member, said support member and slide member having coincident longitudinal slots therein to receive the flange element of said clamp member, the bottom edge of the flange element being undercut to form a bearing surface for engagement with the bottom of the longitudinal slot in said slide member, and means connected to the luggage rack and said movable slide member for selectively displacing said slide member with respect to said support member whereby said slide member may engage the flange element of said clamp member and thus cause the inwardly bent element of said clamp member to engage the roof gutter while drawing the said clamp member and slide member together on opposed sides of said support member to fasten the luggage rack to the roof gutter.

2. An attachment as claimed in claim 1 wherein said means for displacing said slide member comprises a rotatable screw, said slide member being threadably connected thereto for movement when said screw is rotated and resilient means between said slide member and the luggage rack to facilitate movement of said slide member when the the screw is rotated.

3. An attachment as claimed in claim 1 and further comprising a transverse pin at the top of said flange element extending outwardly on each side of said flange on the inside of said slide member to permit said clamp member to be released without becoming detached from the attachment.

References Cited

UNITED STATES PATENTS

| | | | |
|---|---|---|---|
| 3,525,461 | 8/1970 | Bronson | 224—42.1 F |
| 3,348,747 | 10/1967 | Vuarchex | 224—42.1 F |

GERALD M. FORLENZA, Primary Examiner

F. E. WERNER, Assistant Examiner

U.S. Cl. X.R.

224—42.1 G